H. A. DORMAN.
DIFFERENTIAL MECHANISM.
APPLICATION FILED AUG. 8, 1914.

1,254,782.

Patented Jan. 29, 1918.
2 SHEETS—SHEET 1.

WITNESSES:

INVENTOR
Harley A. Dorman
BY
ATTORNEY

H. A. DORMAN.
DIFFERENTIAL MECHANISM.
APPLICATION FILED AUG. 8, 1914.
1,254,782.
Patented Jan. 29, 1918.
2 SHEETS—SHEET 2.
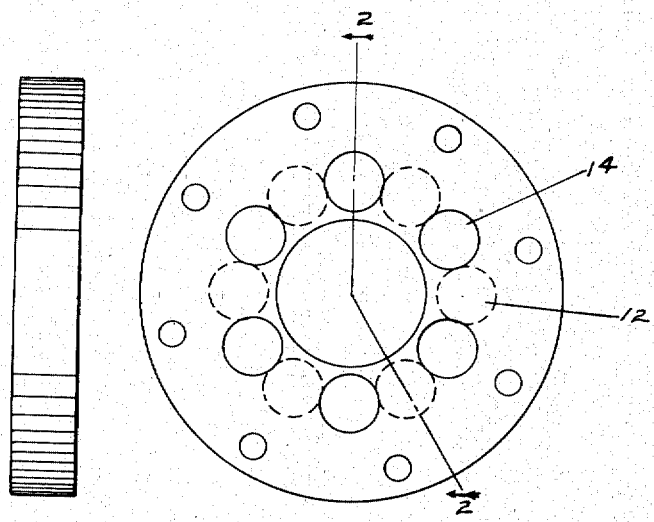
Fig 2.  Fig 3.
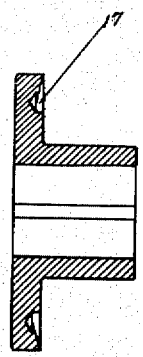
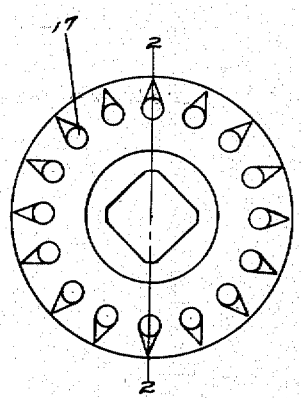
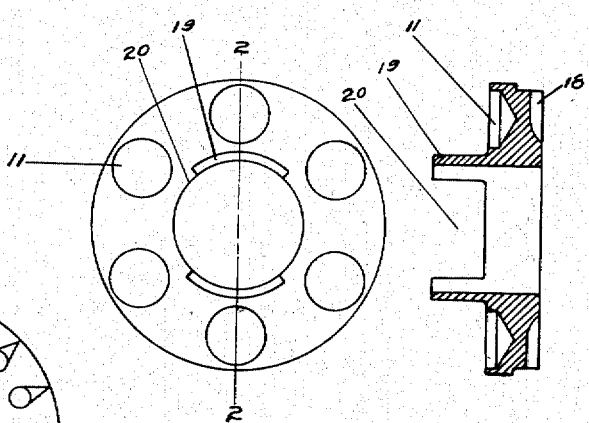
Fig 6.  Fig 7.  Fig 4.  Fig 5.
INVENTOR
Harley A. Dorman
BY
John Pauck
ATTORNEY

UNITED STATES PATENT OFFICE.

HARLEY A. DORMAN, OF DETROIT, MICHIGAN.

DIFFERENTIAL MECHANISM.

1,254,782.  Specification of Letters Patent.  Patented Jan. 29, 1918.

Application filed August 8, 1914. Serial No. 855,741.

*To all whom it may concern:*

Be it known that I, HARLEY A. DORMAN, of Detroit, in the county of Wayne and State of Michigan, have invented a certain new and useful Improvement in Differential Mechanism, of which the following is a specification.

This invention relates to the transmission of power from the main drive-gear, worm-wheel, or sprocket-wheel, commonly used in the rear axle of a motor car, to the rear wheels.

The chief feature of my invention is the method by which the power is transmitted to the drive wheels.

My invention has, furthermore, the feature of eliminating a certain set of gears in the rear axle of a motor car, known as the differential gears.

Another feature of my invention is found in the fact that the power is transmitted to the loaded wheel. That is, if conditions are such that one wheel offers little or no resistance to turning, while the other or second wheel does, the power will be transmitted to the second wheel.

With the foregoing objects in view, my invention consists in the novel combination and arrangement of parts hereinafter fully described, illustrated in the accompanying drawings, forming a part of this specification, and particularly pointed out in the claims hereunto appended.

Figure 1:
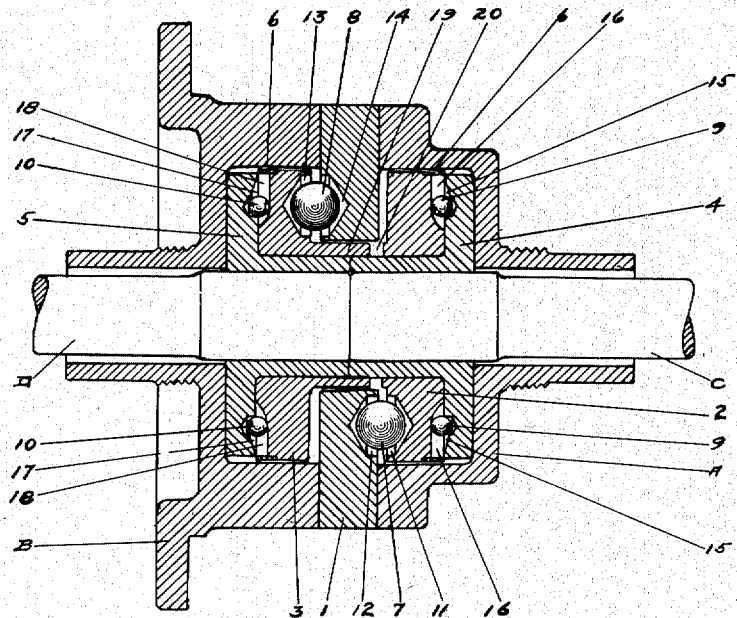
Figure 8:
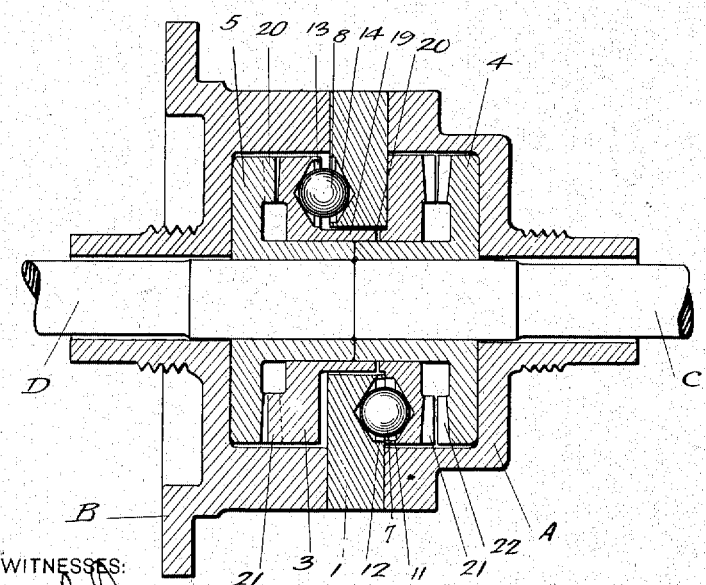

In detail Figure 1 is a sectional view of a rear axle as taken on the line 2—2 Fig. 3. Fig. 2 is an edge view of the main drive plate. Fig. 3 is a face view of the main drive plate. Fig. 4 is a face view of a lock plate. Fig. 5 is a cross-section on line 2—2 Fig. 4. Fig. 6 is a cross-section on line 2—2 Fig. 7. Fig. 7 is a face view of a side plate. Fig. 8 is a sectional view similar to Fig. 1, showing teeth for locking side plates and lock plates. Similar numerals refer to similar parts throughout the several views.

"A" and "B" are parts of a differential case which, in size, shape, and construction, are to be adapted to suit the various makes of motor cars.

"C" and "D" are parts of drive shafts as commonly used to connect with rear wheels.

The drive plate 1 is securely fastened to "A" and "B", to one of which is fastened the driving gear, worm-wheel, or sprocket-wheel; or, in case the drive plate is fastened to the driving gear, worm-wheel, or sprocket-wheel, "A" and "B" are fastened to drive plate 1. On both sides of plate 1 are several pockets as 12 and 14. Lock plates 2 and 3 are similar and so placed that the tongues 19 of the one are in the notches 20 of the other, but so constructed that one lock plate may revolve a certain distance with relation to the other.

On one side of lock plates 2 and 3 are several pockets as 11 and 13. On the other side of 2 and 3 are several grooves or pockets as 16 and 18 in which small balls as 9 and 10 are held, or teeth as 21.

Side plates 4 and 5 are similar and so fastened to drive shafts "C" and "D" respectively, that drive shafts "C" and "D" must turn whenever side plates 4 and 5 turn and vice versa. In one side of plates 4 and 5 are several pockets, as 15 and 17 or teeth as 22. Rings 6 are pressed onto lock plates 2 and 3 to keep the balls 9 and 10 from rolling out of grooves 16 and 18.

When plate 1 is rotated, the balls 7 and 8, rolling on the inclined bottom of their respective pockets as 11—12 and 13—14, force plates 2 and 3 away from plate 1, thus forcing the balls carried by lock plates 2 and 3 into the pockets of side plates 4 and 5 or the teeth of lock plates 2 and 3 into mesh with the teeth of side plates 4 and 5, thereby driving shafts "C" and "D".

In Fig. 1 when drive shaft "D" has a tendency to turn faster than drive shaft "C" of which a good example is a motor car going around a curve, shaft "D" being connected to the outside wheel, plates 3 and 5 turn until the side of the tongue 19 of plate 3 hits the side of the notch 20 of plate 2. This brings the center of the pockets, as 13 of plate 3, in line with the center of the pockets, as 14 of plate 1, leaving plate 3 free to move toward plate 1. The center of the balls 10 being below the face of lock plate 3, makes a certain pressure angle which forces plate 3 toward plate 1 until the balls 10 clear plate 5, leaving plate 5 and consequently shaft "D" free to turn. Similarly in Fig. 8 when shaft "D" has a tendency to turn faster than shaft "C" plates 3 and 5 turn until the tongues 19 and the notches 20 aline the pockets as 13 of plate 3 with the pockets as 14 of plate 1, leaving plate 3 free to move toward plate 1. The sides of the teeth being at an angle to the faces of the plates force the lock plate 3 toward plate 1 until the teeth clear, leaving plate 5 and consequently shaft "D" free to turn. The tongues 19 and the notches 20 are so constructed that they limit the rotation of lock plate 2 with respect to lock plate 3 and are of such a length that it is impossible for both lock plates 2 and 3 to be disengaged from side plates 4 and 5 at one and the same time. When the balls as 7 and 8 have forced the lock plates 2 and 3 a certain distance from the drive plate 1, they come in contact with the sides of their respective pockets and practically all of the remainder of the power transmitted from the drive plate to the lock plates acts as a shearing moment upon the balls.

Several methods can be used for locking plate 2 to plate 4 and plate 3 to plate 5. For example, as shown by Fig. 8 teeth as 21—22 could be cut in the faces of the plates 4 and 5 instead of pockets 15 and 17 and corresponding teeth in the faces of plates 2 and 3 in place of notches 16 and 18.

Having thus fully described my invention, what I claim as new and desire to secure by Letters Patent is:—

1. A driving mechanism including a divided shaft, a main drive plate, a set of side plates actuating the shaft sections, a set of lock plates between said drive plate and side plates, a plurality of balls placed in opposed pockets of the drive plate and lock plates, each of said lock plates carrying a plurality of balls that will lock the lock plates to the side plates when the shaft sections are turning at practically the same speed and will unlock a side plate from its lock plate when one shaft section rotates faster than the other.

2. A driving mechanism including a divided shaft, a main drive plate, a set of side plates actuating the shaft sections, a set of lock plates between said drive plate and said side plates, releasable clutching means between the locking plates and side plates, a plurality of balls placed in opposed pockets of the drive plate and lock plates, the bottom of said pockets being inclined to the face of the plates so that the said balls will force the lock plates from the drive plate when power is being transmitted from the driving to the driven member.

3. A driving mechanism including a divided shaft, a main drive plate, a set of side plates actuating the shaft sections, a set of lock plates between said drive plate and side plates, releasable clutching means between said lock plates and side plates, a plurality of balls carried in the opposed pockets of the drive plate and lock plates, each of said lock plates having tongues fitted into notches of the other lock plate so that its rotation is limited with respect to the other lock plate, which will permit the alinement of the opposed pockets of one lock plate with the drive plate, unlocking the corresponding side plate, and allowing one shaft section to rotate faster than the other.

4. A driving mechanism including a divided shaft, a main drive plate, a set of side plates actuating the shaft sections, a set of lock plates between said drive plate and said side plates, a plurality of balls carried in the opposed pockets of drive plate and lock plates, each lock plate carrying a plurality of balls that will form a ball bearing between said lock plate and said side plate when said lock plate is running free of the corresponding side plate.

5. A driving mechanism including a divided shaft, a main drive plate, a set of side plates actuating the shaft sections, a set of lock plates between said drive plate and said side plates, sets of balls carried by opposed pockets in drive plate and lock plates; and means for locking a side plate and a lock plate when power is being transmitted from a driving to a driven member or releasing a side plate from a lock plate when one shaft section rotates faster than the other.

6. A driving mechanism including a divided shaft, a main drive plate, a set of side plates actuating the shaft sections, a set of lock plates between said side plates and drive plate, a plurality of balls carried by opposed pockets of the drive plate and lock plates, releasable clutching means between the side plates and lock plates, the said lock plates having tongues so proportioned to the spaces between the said lock plates, drive plate, and side plates, that both shaft sections cannot run free of the drive plate at the same time.

HARLEY A. DORMAN.

Witnesses:
MAUDE R. FRANÇOIS,
W. M. MACLACHLAN.